(12) United States Patent
Koyama

(10) Patent No.: US 12,539,470 B2
(45) Date of Patent: Feb. 3, 2026

(54) WATER DROPLET DRAMATIZATION SYSTEM AND WATER DROPLET DRAMATIZATION METHOD

(71) Applicant: TEAMLAB INC., Tokyo (JP)

(72) Inventor: Yoshimi Koyama, Tokyo (JP)

(73) Assignee: TEAMLAB INC., Tokyo (JP)

( * ) Notice: Subject to any disclaimer, the term of this patent is extended or adjusted under 35 U.S.C. 154(b) by 400 days.

(21) Appl. No.: 18/549,591

(22) PCT Filed: Dec. 28, 2021

(86) PCT No.: PCT/JP2021/048885
§ 371 (c)(1),
(2) Date: Sep. 8, 2023

(87) PCT Pub. No.: WO2022/190587
PCT Pub. Date: Sep. 15, 2022

(65) Prior Publication Data
US 2024/0165533 A1    May 23, 2024

(30) Foreign Application Priority Data
Mar. 11, 2021   (JP) .................................. 2021-039470

(51) Int. Cl.
*A63J 21/00* (2006.01)
*A63J 5/02* (2006.01)
(Continued)

(52) U.S. Cl.
CPC ................. *A63J 21/00* (2013.01); *A63J 5/02* (2013.01); *F21S 10/002* (2013.01); *G02B 30/56* (2020.01);
(Continued)

(58) Field of Classification Search
CPC ............................. G03B 21/608; F21S 10/002
See application file for complete search history.

(56) References Cited

U.S. PATENT DOCUMENTS

| | | | | |
|---|---|---|---|---|
| 4,426,021 A | * | 1/1984 | Rosenthal ............ | B67D 1/0875 40/442 |
| 10,738,954 B2 | * | 8/2020 | Bruls ..................... | E03C 1/0404 |

(Continued)

FOREIGN PATENT DOCUMENTS

| JP | 5-27695 A | 2/1993 |
|---|---|---|
| JP | H07-46522 A | 5/1995 |

(Continued)

OTHER PUBLICATIONS

International Search Report of International Patent Application No. PCT/JP2021/048885 completed on Jan. 18, 2022 and mailed Feb. 1, 2022 (4 pages).

(Continued)

*Primary Examiner* — Alexander K Garlen
(74) *Attorney, Agent, or Firm* — Pyprus Pte Ltd; George Liu

(57) ABSTRACT

[Problem] To improve the degree of freedom of dramatization in which the afterimage effect of water droplets is utilized. [Solution] While water droplets W are intermittently produced by a water droplet production device 10, light is beamed onto the water droplets W along the travel path of the water droplets W by an illumination device 20. An illumination device with which it is possible, when each cycle by which light is beamed onto the water droplets W is split by time into a plurality of sections, to control the light emission state for each of the sections, is employed as the illumination device 20. It is thereby made possible to, e.g., cause a single droplet to shine in multiple colors or freely change the size or movement of afterimages of the water droplets viewed by a viewer.

5 Claims, 8 Drawing Sheets

(51) Int. Cl.
  *F21S 10/00* (2006.01)
  *F21W 121/00* (2006.01)
  *F21Y 113/13* (2016.01)
  *F21Y 115/10* (2016.01)
  *G02B 30/56* (2020.01)
  *G03B 21/608* (2014.01)

(52) U.S. Cl.
  CPC ....... *G03B 21/608* (2013.01); *F21W 2121/00* (2013.01); *F21Y 2113/13* (2016.08); *F21Y 2115/10* (2016.08)

(56) References Cited

U.S. PATENT DOCUMENTS

2008/0271795 A1\* 11/2008 Buhlmann ............ E03C 1/0404
  137/551
2017/0206814 A1\* 7/2017 Barton .................... G09F 19/20
2018/0111152 A1\* 4/2018 Fuller ..................... B05B 12/02
2019/0060944 A1\* 2/2019 Fuller ..................... B05B 12/04

FOREIGN PATENT DOCUMENTS

| JP | 7-154830 A | 6/1995 |
|---|---|---|
| JP | 2013-17161 A | 1/2013 |
| JP | 2013-91019 A | 5/2013 |

OTHER PUBLICATIONS

Written Opinion of International Patent Application No. PCT/JP2021/048885 completed on Jan. 18, 2022 and mailed Feb. 1, 2022 (3 pages).

\* cited by examiner

WATER DROPLET DRAMATIZATION SYSTEM AND WATER DROPLET DRAMATIZATION METHOD

TECHNICAL FIELD

The present invention relates to a water droplet dramatization system and a water droplet dramatization method. To describe specifically, the present invention relates to a system and a method for emitting light, at predetermined cycles, to water droplets that are intermittently generated and that free-fall down to allow a viewer to visually recognize afterimages of the water droplets to make it possible to make the viewer to have an illusion that as if the water droplets are floating in the air.

BACKGROUND ART

Conventionally, it has been proposed such a water droplet dramatization method that utilizes an afterimage effect that occurs by emitting light at predetermined cycles to water droplets falling down at constant time intervals. For example, Patent Literature 1 discloses an enjoyment and observation method for alternately emitting multi-stroboscopic light in two or more colors to a plurality of artificial water droplets that are continuously flowing at constant time intervals to allow the water droplets to alternately shine in the two or more colors.

CITATION LIST

Patent Literature

Patent Literature 1: Japanese Examined Patent Application Publication No. H7-46522

SUMMARY OF THE INVENTION

Technical Problem

By the way, in Patent Literature 1, multi-stroboscopic light is utilized to allow a plurality of water droplets to alternately shine in two or more colors, but, when a single water droplet is focused on, the water droplet is merely irradiated with light in a single color. Therefore, it has been impossible with the method described in Patent Literature 1 to allow a single water droplet to shine in a plurality of colors.

Furthermore, with the method described in Patent Literature 1, all water droplets are perceived by a viewer as afterimages all having an identical size (specifically, a length in a falling direction). Therefore, with the method described in Patent Literature 1, it is also impossible to change the size of afterimages of water droplets, which are visually recognized by a viewer.

As described above, such conventional methods only allow changing of a dramatization to an extent that the color of water droplets is changed, resulting in such issues that, when allowing a viewer to see the dramatization repeatedly or for a long period of time, the viewer may feel less interested in the dramatization. In view of those issues described above, a main object of the present invention is to further increase a degree of freedom in a dramatization utilizing afterimages of water droplets.

Solution to Problem

As a result of keen examinations for solving those issues in such conventional technologies as described above, the inventor of the present invention has come to an idea that a cycle during which light is emitted to water droplets is further time-divided, and a light emission state of an illumination device is controlled per each of the time segments. Thereby, such knowledge has been acquired that, for example, it is possible to allow a single water droplet to shine in a plurality of colors, and to change the size and the movement of afterimages of water droplets, which are visually recognized by a viewer. Then, the inventor of the present invention has determined that it is possible to solve, based on the knowledge described above, those issues arising in the conventional technologies, and thus has come to the present invention. To describe specifically, the present invention includes configurations or steps described below.

A first aspect of the present invention relates to a water droplet dramatization system. The water droplet dramatization system according to the present invention includes a water droplet generation device that intermittently generates water droplets and an illumination device that emits light to the water droplets at predetermined cycles. Note that, although it is not required that the cycle during which the illumination device emits light to the water droplets fully coincide with a cycle during which the water droplet generation device generates the water droplets, it is desirable that the light emission cycle corresponds to the water droplet generation cycle. For example, it is desirable that the light emission cycle [Hz] ranges from 80% to 120% of the water droplet generation cycle [Hz]. Furthermore, one that is able to control, when one cycle is temporally divided into a plurality of sections, a light emission state per each of the sections is used as the illumination device. Note that controlling the light emission state per each of the sections includes, for example, setting the color (color tone and/or gradation) and the brightness (emission intensity) of light emitted per each of the sections and controlling ON or OFF of light emission per each of the sections. Note that the illumination device is not limited to one that emits light in a plurality of colors to the water droplets, but may be one that emits light in a single color to the water droplets. In particular, the illumination device is disposed to emit light along a travel path of the water droplets. Specifically, when water droplets free-fall down from top to bottom, the illumination device emits light in parallel to a falling path of the water droplets (i.e., vertically), that is, emits light to the water droplets from immediately above or below the water droplets.

As described above, it is possible to regard that time-dividing each of the light emission cycles corresponds to dividing a space in which water droplets move during one cycle of the light emission cycles. Therefore, it is possible to regard a space in which water droplets move during one cycle of the light emission cycles as a display, and it is also possible to regard such a divided space as a pixel representing the minimum unit of an image, making it possible to freely render the water droplets with colors. Furthermore, the viewer visually recognizes the water droplets irradiated with light as afterimages. Therefore, according to the present invention, it is possible to utilize afterimages of water droplets to provide an animation expression at a higher degree of freedom. It is also possible to provide a wide variety of renderings expressed by utilizing afterimages of water droplets, such as a certain water droplet is allowed to shine in a plurality of colors, the size of an afterimage of a certain water droplet is shortened or extended, and an afterimage of a certain water droplet is slowly moved upward or downward. Furthermore, since the illumination device is configured to emit light along the travel path of water droplets, it is possible to form such a rendering space that water droplets irradiated with light pour, and it is possible to allow a person to enter the rendering space.

In the water droplet dramatization system according to the present invention, as described above, it is desirable that the illumination device is at least able to control the color of light emitted per each of the sections acquired by time-dividing a light emission cycle. Furthermore, it is desirable that the cycle during which the illumination device emits light to water droplets substantially coincide with the cycle during which the water droplet generation device generates the water droplets. Although it is ideal that the light emission cycle coincides at 100% with the water droplet generation cycle, it is acceptable that there may be an error of approximately +/−5%.

In the water droplet dramatization system according to the present invention, the illumination device may include a plurality of light emitting elements. Specifically, it is desirable that a plurality of water droplets that are ejected from the water droplet generation device and that are present in the air at an identical time are simultaneously irradiated with light emitted by the plurality of light emitting elements. Note that a plurality of water droplets that are present in the air at an identical time may be those ejected from an identical nozzle of the water droplet generation device or may be those ejected from another nozzle. By allowing water droplets to be irradiated with light emitted by a plurality of light emitting elements, as described above, it is possible to change how the water droplets shine per each of the light emitting elements.

In the water droplet dramatization system according to the present invention, it is desirable that the light emitting elements included in the water droplet generation device are narrow-angle light-distributing light sources (so-called spot lights) with a ½ light distribution angle equal to or narrower than 20 degrees. Note that the ½ light distribution angle refers to an angular range within which the light intensity (optical intensity) of light emitted by a light emitting element is equal to or greater than a half of its maximum value. The measurement of a ½ light distribution angle is performed by causing a light receiver to move while keeping a constant distance from a light emitting element to measure the optical intensity at each angle. By using a light source having a narrower light distribution angle as each of light emitting elements, as described above, it is possible to accurately control the state of light emitted to water droplets, making it possible to allow a viewer to more clearly perceive afterimages of the water droplets.

A second aspect of the present invention relates to a water droplet dramatization method. In the water droplet dramatization method according to the present invention, water droplets are intermittently generated, and light is emitted to the water droplets at predetermined cycles. At this time, one cycle of light emission cycles is temporally divided into a plurality of sections, and a light emission state is adjusted per each of the sections. Furthermore, light is emitted along a travel path of the water droplets.

Advantageous Effects of Invention

According to the present invention, it is possible to increase a degree of freedom in a dramatization utilizing afterimages of water droplets.

DESCRIPTION OF EMBODIMENTS

Embodiments of the present invention will now be described herein with reference to the accompanying drawings. Note that the present invention is not limited to have the embodiments described below, but includes those appropriately changed from the embodiments described below within the range obviously perceived by those skilled in the art.

Figure 1:
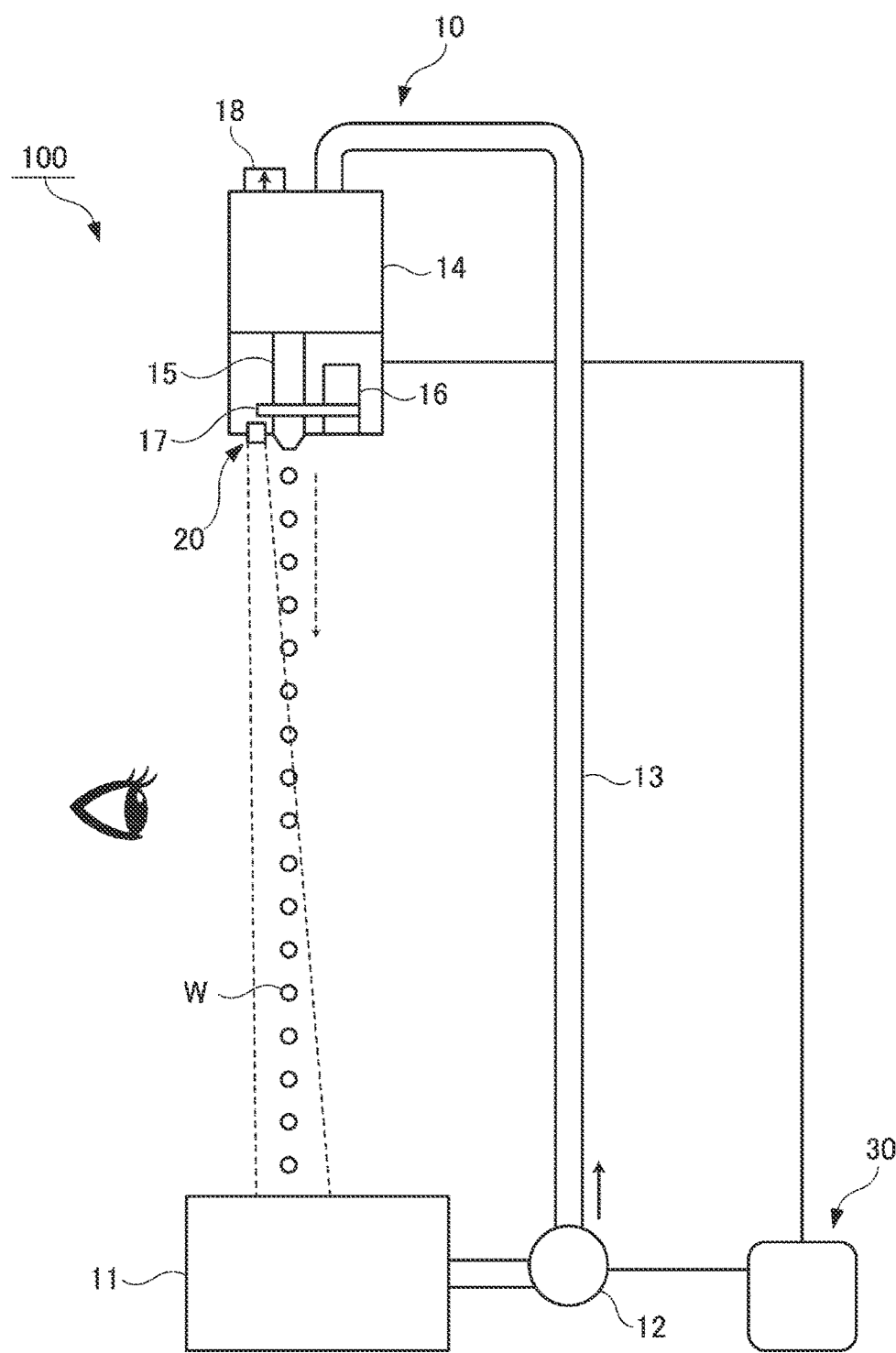
FIG. 1 schematically illustrates a configuration of a water droplet dramatization system.

FIG. 1 illustrates a configuration example of a water droplet dramatization system 100 according to the present invention. As illustrated in FIG. 1, the system 100 according to the present invention includes a water droplet generation device 10, an illumination device 20, and a control device 30. The water droplet generation device 10 intermittently generates water droplets W at predetermined cycles. The illumination device 20 emits light at predetermined cycles to the water droplets W that the water droplet generation device 10 has generated. The control device 30 is coupled to the water droplet generation device 10 and the illumination device 20 to control the cycles and an amount of water for the water droplets that the water droplet generation device 10 generates and to control the cycles and a light emission state of light that the illumination device 20 emits. A viewer visually recognizes afterimages of the water droplets W irradiated with light emitted by the illumination device 20.

Typically, as long as each of the water droplet generation cycles and each of the light emission cycles coincide with each other, the viewer sees an afterimage of the water droplets W as if the water droplets are floating and staying in the air. Furthermore, when each of the light emission cycles is shorter than each of the water droplet generation cycles, the viewer sees an afterimage of the water droplets W as if the water droplets are slowly moving upward in a direction opposite to an actual falling direction of the water droplets W. Conversely, when each of the light emission cycles is longer than each of the water droplet generation cycles, the viewer sees an afterimage of the water droplets W as if the water droplets are slowly moving downward in the actual falling direction of the water droplets W. The system 100 according to the present invention provides a dramatization utilizing water droplets and light based on such a basic principle as described above. Furthermore, in the present invention, each of the light emission cycles is further divided into a plurality of segments, and the light emission state is controlled per each of the segments, as will be described later in detail, and, as a result, it is possible to express movements (upward or downward movements) of an afterimage of the water droplets W even in a state where each of the light emission cycles and each of the water droplet generation cycles coincide with each other.

For the water droplet generation device 10, there is no particular limitation, but it is possible to utilize one that is publicly known. The water droplet generation device 10 may be, for example, as illustrated in FIG. 1, one that continuously generates the water droplets W at constant intervals and causes the generated water droplets to simply fall down. Furthermore and additionally, as the water droplet generation device 10, it is possible to adopt one that ejects the water droplets W upward to allow the water droplets W to move in a parabolic manner (not illustrated). Furthermore, the water droplets W ejected from the water droplet generation device 10 typically each form a spherical shape (i.e., a drop of water) while the water droplets are falling down in the air. However, the shape of each of the water droplets W is not limited to the spherical shape, but it is possible that a state of each of the water droplets immediately after ejected from the water droplet generation device 10 is linear or spiral, for example. As the water droplet generation device 10, it is possible to utilize or apply one of those disclosed in Japanese Unexamined Patent Application Publications Nos. 09-141157, 2000-107647, and 2013-91019, for example.

An example of the water droplet generation device 10 will now be described with reference to FIG. 1. In the water droplet generation device 10, water is stored in a water reservoir 11, and the water in the water reservoir 11 is pumped up by a pump 12. When the pump 12 is operated, the water is supplied, via a pipe 13, to a tank 14 positioned above the water reservoir 11, and is temporarily stored in the tank 14. The tank 14 is coupled to a nozzle 15, and the water in the tank 14 is discharged from the nozzle 15 at a constant quantity at a time. Furthermore, vibrations generated by a vibrator 16 are transmitted, via a vibration plate 17, to the nozzle 15. Thereby, vibrations are applied by the vibrator 16 and the vibration plate 17 to the nozzle 15 when the water is discharged from the nozzle 15, allowing the water droplets W (specifically, drops of water) to be intermittently ejected from an outlet of the nozzle 15. The generation cycles of the water droplets W by the nozzle 15 depend on a vibration frequency of the vibrator 16. For example, it is desirable that the vibration frequency of the vibrator 16 ranges from 30 Hz to 100 Hz, and it is more desirable that it ranges from 55 Hz to 75 Hz. The water droplets W ejected from the nozzle 15, which free-fall down as they are, are stored in the water reservoir 11. Furthermore, the water in the water reservoir 11 is pumped up again by the pump 12 and is caused to circulate in the water droplet generation device 10. It is possible that the pump 12 and the vibrator 16 of the water droplet generation device 10 are controlled by the control device 30. By adjusting an amount of water to be supplied by the pump 12, it is possible to control an amount of water to be ejected from the nozzle 15 per each of the water droplets W. Furthermore, by adjusting the vibration frequency of the vibrator 16, it is possible to control the generation cycles of the water droplets W by the nozzle 15. Furthermore, the tank 14 is provided with an air discharge valve 18 having a check valve structure, allowing air accumulated in the tank 14 to be discharged by the air discharge valve 18 to outside. Thereby, a closed system is attained inside the tank 14 filled with water only.

The illumination device 20 emits stroboscopic light to the water droplets W that are generated by the water droplet generation device 10 and that are falling down in the air. The illumination device 20 is disposed adjacent to an ejecting port of the nozzle 15 of the water droplet generation device 10, and emits light to the water droplets W along a falling path (a travel path) of the water droplets W ejected from the nozzle 15. Specifically, when the water droplets W free-fall down from top to bottom, the illumination device 20 emits light substantially in parallel to the falling path of the water droplets W. The illumination device 20 includes a plurality of light emitting elements, for example. It is desirable that, as each of the light emitting elements, a multi-color light emitting element including a plurality of light emitting diodes (LEDs) is used. It is desirable that, as each of the light emitting elements, for example, a full-color LED including at least three color LEDs that emit light in red, blue, and green, respectively is used. Furthermore, each of the light emitting elements may be a four-color light source including a white LED in addition to the three color LEDs. As described above, the illumination device 20 is basically configured such that the illumination device 20 is solely able to simultaneously emit light to the plurality of water droplets W that are falling down in the air.

Furthermore, it is desirable that, as each of the light emitting elements of the illumination device 20, a light source having a narrower light distribution angle, such as a spot light, is used. Specifically, it is desirable that the ½ light distribution angle of each of the light emitting elements ranges from 1 degree to 20 degrees, and it is particularly desirable that it ranges from 3 degrees to 15 degrees or 5 degrees to 10 degrees. By allowing the water droplets W to be irradiated with light using a plurality of narrow-angle light-distributing light sources, as described above, it is possible to highly accurately adjust the color of light to be emitted to each of the water droplets W. Furthermore, since the illumination device 20 uses the narrow-angle light-distributing light sources to allow the water droplets W to be irradiated with light, as described above, it is desirable that the travel path of the water droplets W and the arrangement positions of the light emitting elements are set to be adjacent to each other. For example, it is desirable that a distance between the travel path of the water droplets W and each of the positions of the light emitting elements is equal to or shorter than 1 meter (m), and ranges from approximately 1 centimeter (cm) to approximately 80 cm, approximately 3 cm to approximately 70 cm, or approximately 5 cm to approximately 50 cm, for example.

Furthermore, as each of the light emitting elements, for example, one that is able to control, through high-frequency pulse width modulation (PWM), the light emission state (such as the color, brightness, and ON/OFF of light emitted) for a time unit that is further shorter than each of the generation cycles of the water droplets W is used. For example, when each of the generation cycles of the water droplets W is 50 Hz, each of the light emission cycles by each of the light emitting elements is also accordingly set to 50 Hz. When the light emission cycle of 50 Hz (i.e., 20 milliseconds (ms)) is time-divided by a unit of 50 microseconds (μs), it is possible to divide the cycle into 400 sections (pixels). Then, each of the light emitting elements is able to change the light emission state per each of the sections (pixels) of 50 μs. Specifically, each of the light emitting elements is able to modulate the brightness of light in 128 steps for a pulse of 50 μs, for example. Furthermore, when each of the light emitting elements is a four-color light source that emits light in four colors of red, blue, green, and white, it is possible to modulate the brightness of light in 128 steps for each color, making it possible to regenerate approximately 270 million colors, the number of which is the fourth power of 128. Furthermore, the number of divisions of each of the light emission cycles (i.e., the number of sections) is not limited to 400 as described above, but may be appropriately set. For example, the lower limit to the number of divisions of each of the light emission cycles may be 2, 3, 5, or 10, while the upper limit may be approximately 1000. Furthermore, the illumination device 20 is controlled by the control device 30 for the light emission state of each of the sections. The control device 30 is able to integrally control the plurality of light emitting elements constituting the illumination device 20 or to control the light emission state per each of light-emitting devices.

By dividing a space in which the water droplets W move per cycle of the light emission cycles into several hundred pixels, as described above, it is possible to simply regard the space as a display. Furthermore, when each of the generation cycles of the water droplets W and each of the light emission cycles are allowed to coincide with each other, it is not necessary to adjust a relation between each of the generation cycles of the water droplets W and each of the light emission cycles when taking into account the movement of an afterimage of the water droplets W, but it is sufficient to only adjust the light emission state in each of the sections (pixels) acquired by time-dividing the light emission cycle. Therefore, similar to a normal display, it is possible to control the movement and the color of an afterimage of the water droplets W based on such an idea of manipulating each of the sections (pixels) to achieve animation display. Thereby, it is possible to achieve a dramatization at a higher degree of freedom with simple settings.

The control device 30 controls the water droplet generation device 10 and the illumination device 20. As the control device 30, a general purpose computer may be used or a special purpose controller may be used. Furthermore, although, in the example illustrated in FIG. 1, it is illustrated for purpose of convenience that the water droplet generation device 10 and the illumination device 20 are controlled by the control device 30 solely, the water droplet generation device 10 and the illumination device 20 may be respectively controlled by separate control devices.

Figure 2:
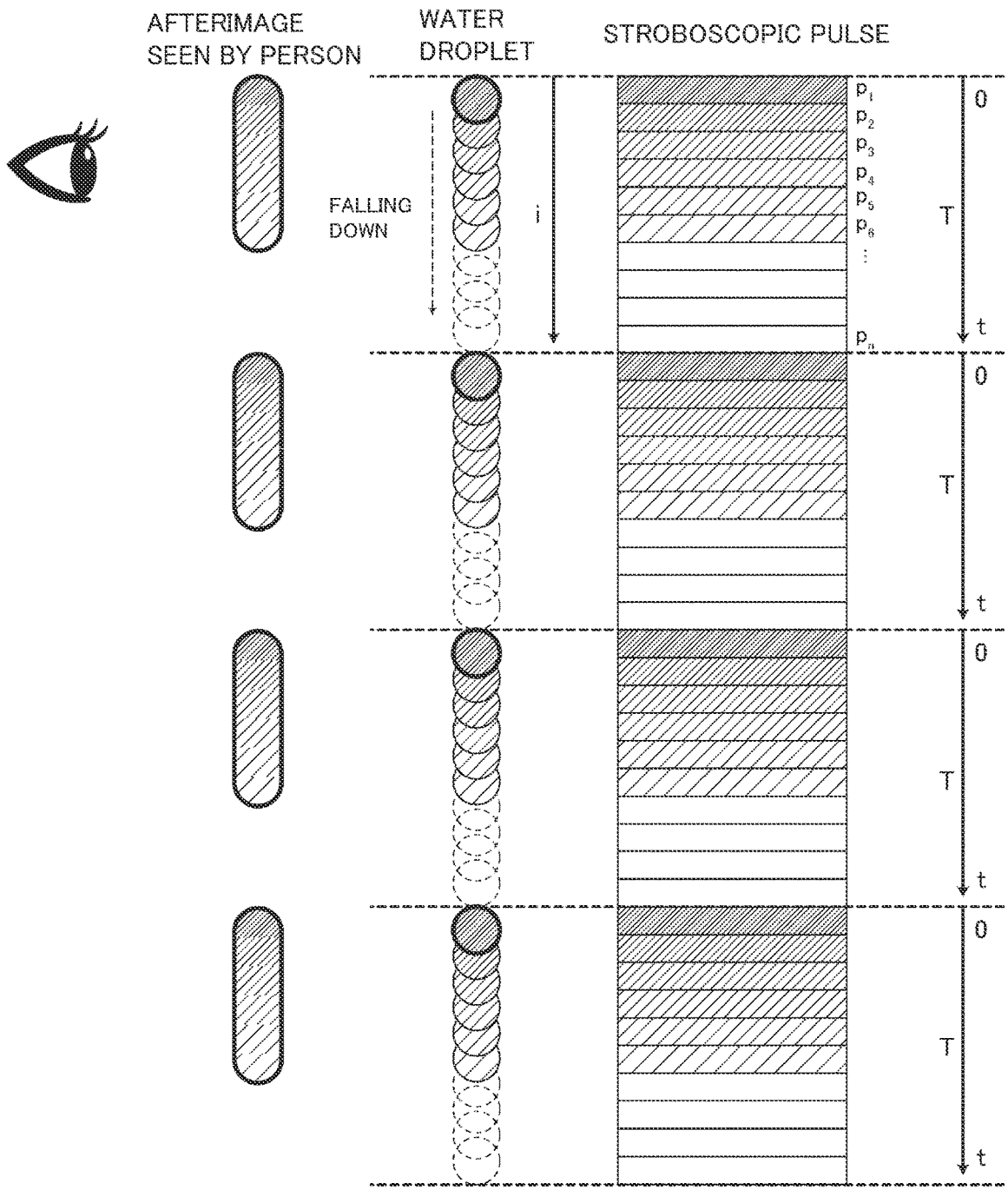
FIG. 2 illustrates a basic concept of a water droplet dramatization method.

Next, a basic concept of a water droplet dramatization method executed by the system 100 described above will now be described herein with reference to FIG. 2. FIG. 2 schematically illustrates, during one light emission cycle T, a change in the light emission state of the illumination device 20 (a stroboscopic pulse), behavior of a water droplet, and an afterimage of the water droplet that the viewer visually recognizes. The one light emission cycle T represents a period of time ranging from a start time 0 to an end time t, that is, from approximately 10 ms to approximately 100 ms (approximately 100 Hz to approximately 10 Hz), for example. In particular, since it is said that the time resolution of the eyes of a human being ranges from approximately 50 ms to approximately 100 ms, it is desirable that the light emission cycle T is set shorter than the time resolution of the human being to achieve an afterimage effect. For example, it is advantageous that the one light emission cycle T ranges from 10 ms to 50 ms. Furthermore, in the example illustrated in FIG. 2, a water droplet generation cycle i substantially coincides with the light emission cycle T. Note that the water droplet generation cycle i is proportional to an interval between a water droplet and the next water droplet.

Furthermore, the one light emission cycle T is time-divided into a plurality of sections $p_1$ to $p_n$. Although, in the example illustrated in FIG. 2, the one light emission cycle T is divided into 10 sections for purpose of convenience, it is possible that the number of divisions is desirably increased or decreased. Then, by dividing the one light emission cycle T into a plurality of sections when the light emission cycle T and the water droplet generation cycle i coincide with each other, it is possible to regard that a space in which water droplets move during the light emission cycle T is configured by a plurality of pixels each representing the minimum unit of an image. That is, by controlling the color, brightness, ON/OFF of light emitted for each of the sections (pixels), it is regarded that the water droplets W serve as a display, making it possible to freely adjust the color and the movement of an afterimage of the water droplets.

Within the one light emission cycle T, in the example illustrated in FIG. 2, the color of light emitted changes in a gradation manner from a dark color to a bright color within the range extending from the section $p_1$ to the section $p_6$, while emission of light is turned OFF in the later sections. The water droplet falling down within the light emission cycle T is irradiated with light in respective corresponding colors within the range extending from the section $p_1$ to the section $p_6$, but is irradiated with no light in the later sections. Therefore, the viewer visually recognizes afterimages of the water droplet irradiated with light in respective corresponding colors within the range extending from the section $p_1$ to the section $p_6$ in the light emission cycle T. Then, as illustrated in FIG. 2, the viewer sees the afterimages of the water droplet, which are similar to ones that stretch in the actual falling direction of the water droplet and that are colored in a gradation manner. By utilizing this principle, it is possible to allow one water droplet to shine in a plurality of colors, and it is also possible to change the shape of an afterimage of one water droplet.

Figure 3:
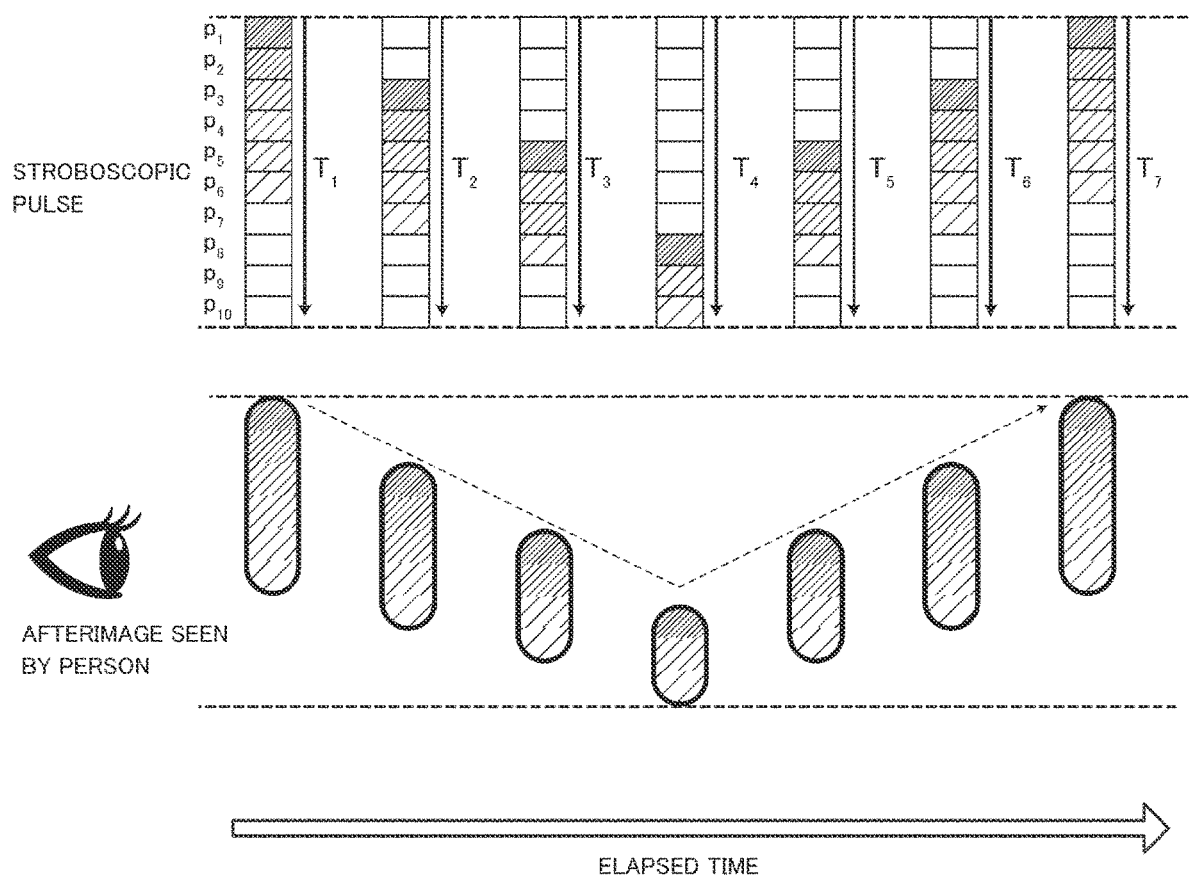
FIG. 3 illustrates an example dramatization of water droplets.

FIG. 3 illustrates an example dramatization of water droplets to which the principle described above is applied. FIG. 3 illustrates, on the premise that the light emission cycle T and the water droplet generation cycle i coincide with each other, and afterimages of water droplets, which are seen from one location, are focused on, how the light emission cycles are repeated within the range extending from a first light emission cycle $T_1$ to a seventh light emission cycle $T_7$. In the example illustrated in FIG. 3, although the viewer sees water droplets as if one water droplet is floating in front of the viewer, and is moving upward and downward while it is stretching and contracting, seven water droplets in fact simply pass by in front of the viewer within the range extending from the first light emission cycle $T_1$ to the seventh light emission cycle $T_7$.

That is, in the example illustrated in FIG. 3, the water droplets are irradiated with light within the range extending from the section $p_1$ to the section $p_6$ in the first light emission cycle $T_1$, but are irradiated with no light in the later sections. A section during which light is emitted to water droplets will be hereinafter referred to as a "light-ON section", while a section during which no light is emitted to water droplets will be hereinafter referred to as a "light-OFF section". After that, in the second light emission cycle $T_2$ and the later cycles, the light-ON sections are shifted in a stepwise manner toward the later sections, and the number of the light-ON sections decreases. Then, the light-ON sections have reached the final section $p_{10}$ in the fourth light emission cycle $T_4$, and its number also reaches the minimum. After that, in the fifth light emission cycle $T_5$ and the later cycles, conversely, the light-ON sections are shifted in a stepwise manner toward the previous sections, and the number of transmission sections increases. Then, in the seventh light emission cycle $T_7$, the light-ON sections return to a state identical to that in the first light emission cycle $T_1$. By repeating those steps described above, the viewer sees water droplets as if one water droplet is floating in front of the viewer, and is moving upward and downward while it is stretching and contracting, as illustrated in FIG. 3.

Figure 4:
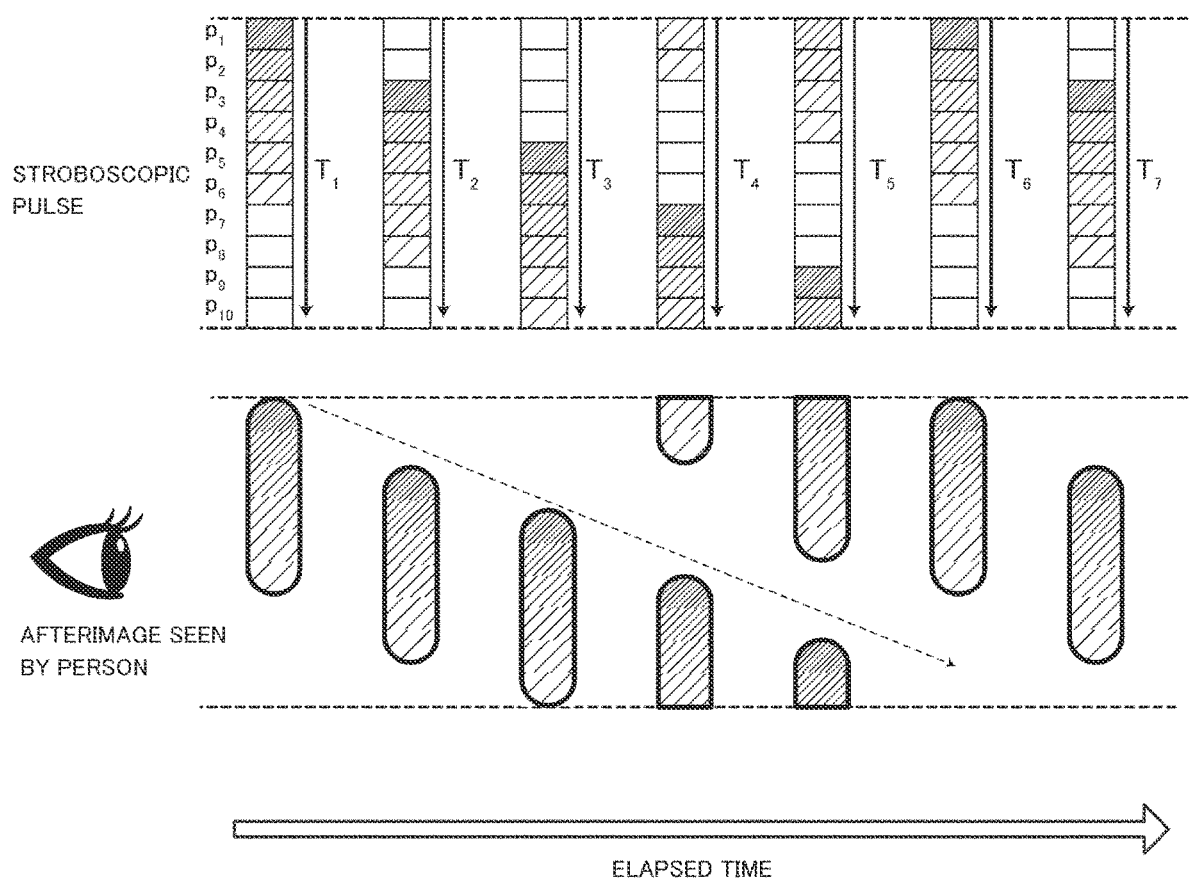
FIG. 4 illustrates another example dramatization of water droplets.

FIG. 4 illustrates another example dramatization of water droplets. In the example illustrated in FIG. 4, the section $p_1$ to the section $p_6$ in the first light emission cycle $T_1$ are designated as light-ON sections, while the later sections are designated as light-OFF sections. After that, in the second light emission cycle $T_2$ and the later cycles, the light-ON sections are shifted in a stepwise manner toward the later sections. Furthermore, when the light-ON sections have reached the final section $p_{10}$, similar to those in the fourth light emission cycle $T_4$, the first and second sections $p_1$ and $p_2$ are designated to be light-ON sections to make the total number of light-ON sections to be always constant. By repeating those steps described above, the viewer sees water droplets as if they are slowly falling down in front of the viewer at a speed slower than the speed of free-falling, as illustrated in FIG. 4.

Figure 5:
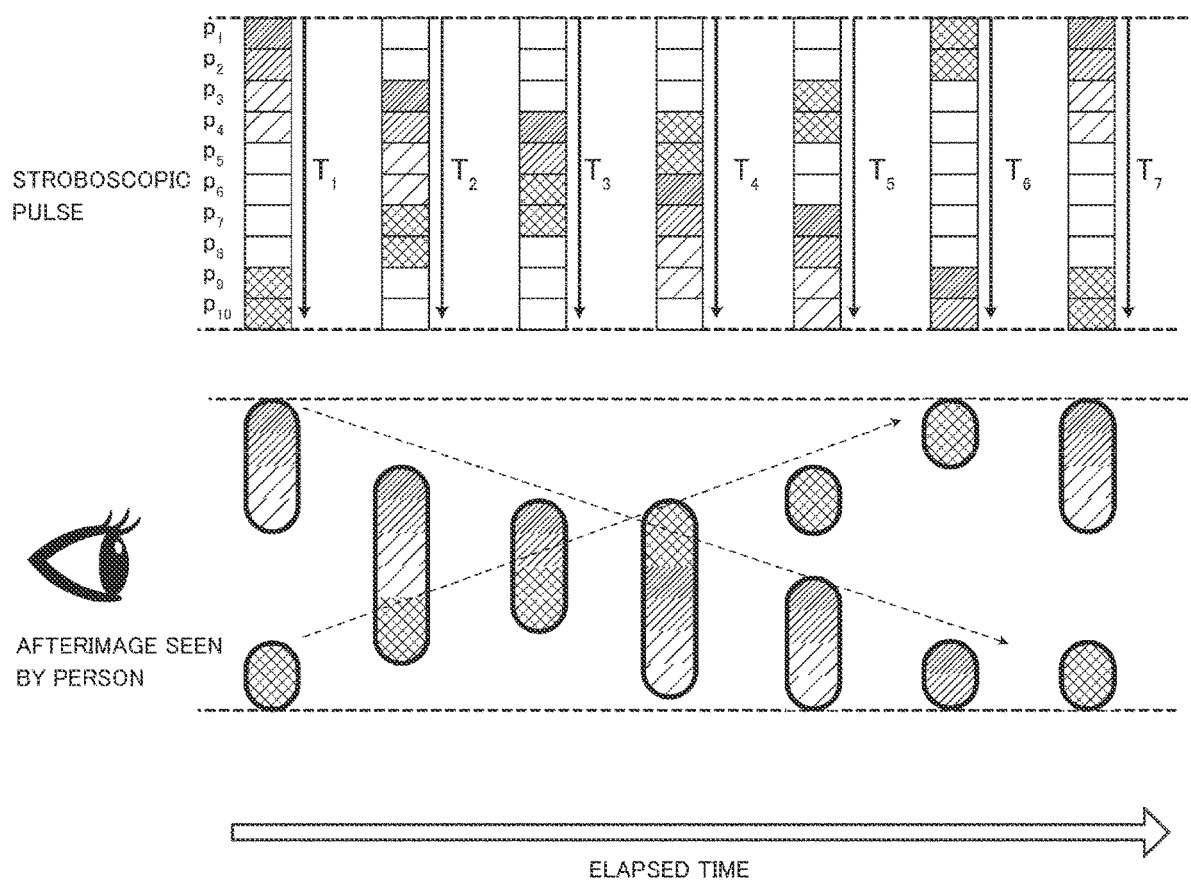
FIG. 5 illustrates still another example dramatization of water droplets.

FIG. 5 illustrates still another example dramatization of water droplets. In the example illustrated in FIG. 5, the section $p_1$ to the section $p_4$ in the first light emission cycle $T_1$ are designated as a first light-ON section, the section $p_5$ to the section $p_8$ are designated as a light-OFF section, and the section $p_9$ to the section $p_{10}$ are designated as a second light-ON section. After that, in the second light emission cycle $T_2$ and the later cycles, the first light-ON section is shifted in a stepwise manner toward the later sections, while, in the second light-ON section, the viewer sees two water droplets that are first separated from each other as if the water droplets join each other, and then break up again into two.

The dramatization of water droplets illustrated in FIGS. 3 to 5 and described above are mere examples. By applying the principle of the present invention, it is possible to execute a variety of dramatization.

It is possible that the water droplet dramatization system 100 according to the present invention is, for example, a large system for a fountain or stage application, or a small system for a portable or hand-held application.

Figure 6:
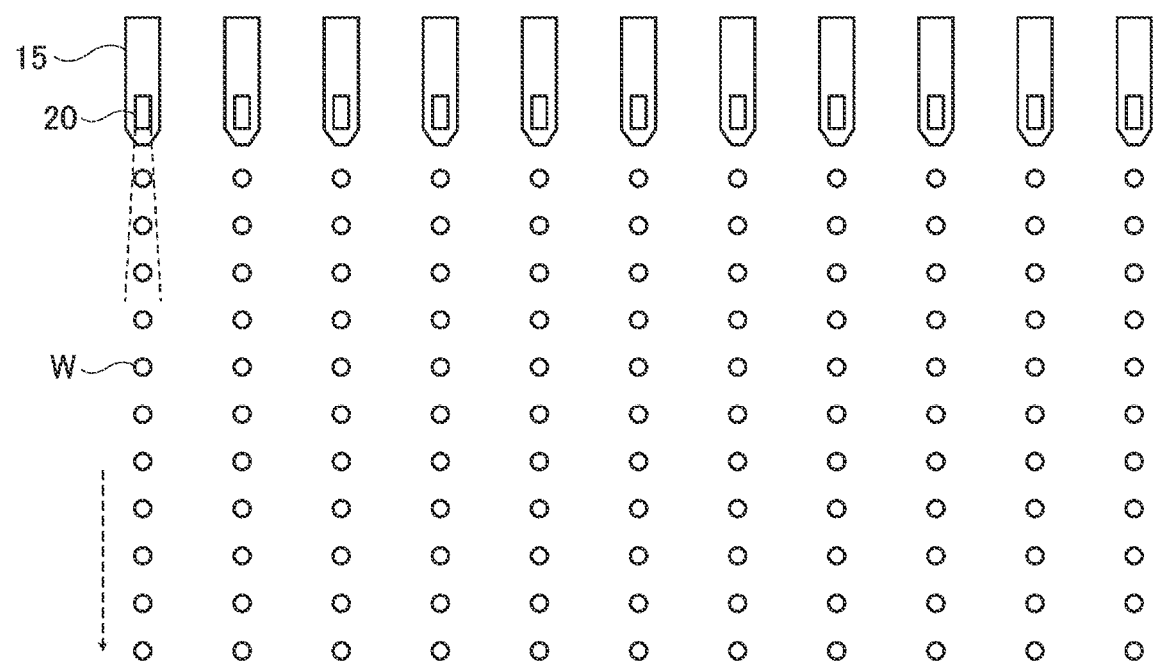
FIG. 6 schematically illustrates a water droplet dramatization system according to another embodiment.

FIG. 6 illustrates an embodiment when the light emitting elements of the illumination devices 20 are disposed to be respectively adjacent to the nozzles 15 of a plurality of the water droplet generation devices 10. In the present embodiment, the illumination devices 20 emit light directly downward in a substantially vertical direction, that is, in the falling direction of the water droplets W. In this case, it is possible that one of the illumination devices 20 emits light to a column of the water droplets W ejected from a corresponding one of the nozzles 15 to change the color. Furthermore, although not illustrated in the drawing, by allowing the light emitting elements disposed directly below ejection ports of the nozzles 15 to emit light directly upward in the vertical direction, it is also possible to allow a column of the water droplets W ejected from one of the nozzles 15 to be irradiated with the light.

Furthermore, as illustrated in FIG. 6, by arranging the nozzles 15 and the illumination devices 20 in a straight line, it is possible to configure a pseudo two-dimensional display.

Figure 7:
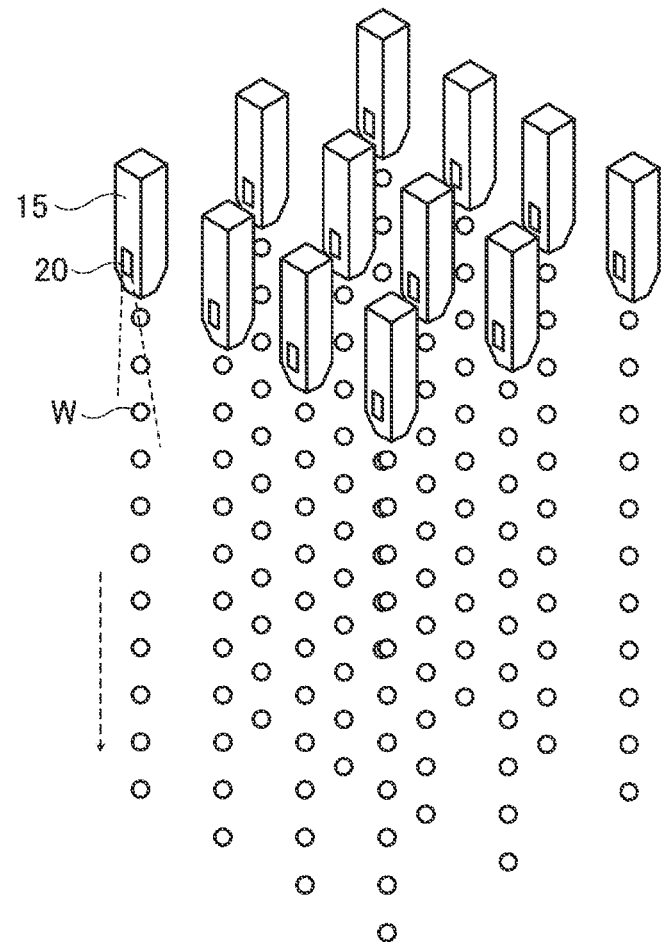
FIG. 7 schematically illustrates a water droplet dramatization system according to still another embodiment.

FIG. 7 illustrates still another embodiment of the water droplet dramatization system 100. As illustrated in FIG. 7, by disposing in a three-dimensional manner the illumination devices 20 disposed to be adjacent to the nozzles 15, it is possible to configure a pseudo three-dimensional display. As illustrated in FIG. 7, by disposing the plurality of illumination devices 20 and the plurality of nozzles 15 at an upper part and allowing the water droplets W to fall down from the nozzles 15, it is possible to form a rendering space in which water droplets irradiated with light pour. Since there are no obstructions such as pillars in the space, a person is able to easily enter the space.

Figure 8:
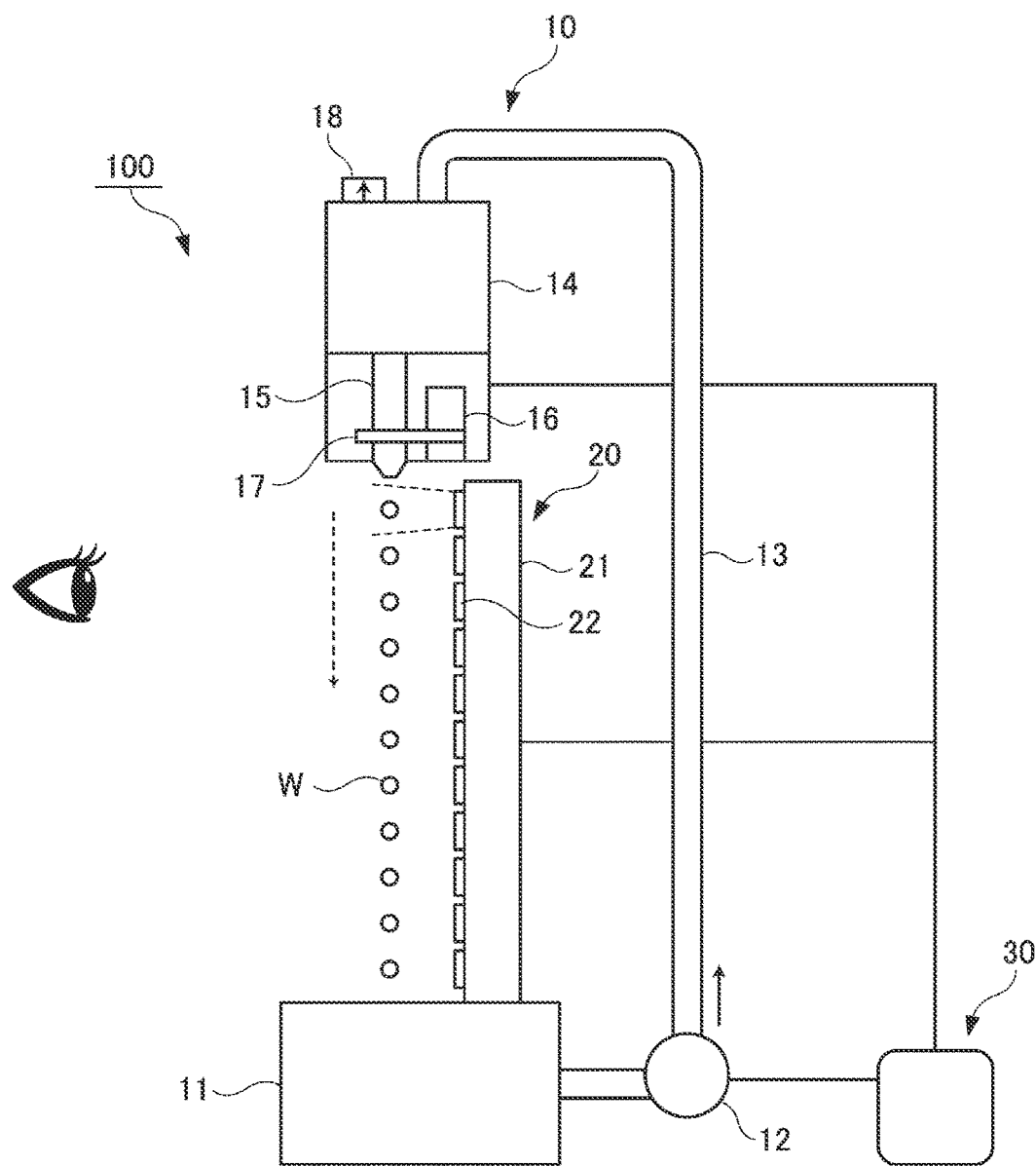
FIG. 8 illustrates a reference example of a water droplet dramatization system.

FIG. 8 illustrates a reference example of the water droplet dramatization system. Although the water droplet dramatization system 100 illustrated in FIG. 8 is not included in the technological scope of the present invention according to claim 1, the water droplet dramatization system is disclosed in the present specification to serve as a reference. Note that there is a possibility that the water droplet dramatization system 100 illustrated in FIG. 8 is to be included within the scope of the present invention when there is a correction in Claims, for example, and the applicant holds an intention of acquiring a patent right for the water droplet dramatization system in the future.

In the example illustrated in FIG. 8, the illumination device 20 emits stroboscopic light to the water droplets W that are generated by the water droplet generation device 10 and that are falling down in the air. The illumination device 20 includes, for example, a support column 21 and a plurality of light emitting elements 22 arranged on the support column 21. As each of the light emitting elements 22, it is desirable that a multi-color light emitting element including a plurality of LEDs is used. Furthermore, the plurality of light emitting elements 22 are disposed and arranged along the travel path of the water droplets W. When the water droplets W fall down vertically, similar to the example illustrated in FIG. 8, for example, the plurality of light emitting elements 22 are disposed and arranged in the vertical directions along the water droplets W. Note that, when the water droplets W move in a parabolic manner, for example, it is possible to similarly dispose and arrange the plurality of light emitting elements 22 in a parabolic manner along the water droplets W. As described above, the illumination device 20 is configured to allow the plurality of light emitting elements 22 to simultaneously emit light to the plurality of water droplets W that are falling down in the air. As described above, the example illustrated in FIG. 8, in which the disposition of the illumination device 20 differs from that of the example illustrated in FIG. 1, is basically identical to the example illustrated in FIG. 1 in terms of the other configurations.

In the present specification, the embodiments of the present invention have been described above with reference to the accompanying drawings to express the content of the present invention. However, the present invention is not limited to the embodiments described above, but includes modified embodiments and improved embodiments that are obviously perceived by those skilled in the art based on those described in the present specification.

REFERENCE SIGNS LIST

10 Water droplet generation device
11 Water reservoir
12 Pump
13 Pipe
14 Tank
15 Nozzle
16 Vibrator
17 Vibration plate
18 Air discharge valve
20 Illumination device
21 Support column
22 Light emitting element
30 Control device
100 Water droplet dramatization system
W Water droplet

The invention claimed is:

1. A water droplet dramatization system comprising:
    a water droplet generation device that intermittently generates water droplets; and
    an illumination device that emits light to the water droplets at predetermined cycles, wherein
    the illumination device is configured to
        emit light having a ½ light distribution angle equal to or narrower than 20 degrees along a downward travel path of the water droplets
        control, where one cycle of the predetermined cycles is temporally divided into a plurality of sections, a light emission state per each of the sections.

2. The water droplet dramatization system according to claim 1, wherein the illumination device is configured to be able to control a color of light emitted per each of the sections.

3. The water droplet dramatization system according to claim 1, wherein the cycle during in which the illumination device emits light to the water droplets substantially coincides with a cycle during in which the water droplet generation device generates the water droplets.

4. The water droplet dramatization system according to claim 1, wherein
    the illumination device includes a plurality of light emitting elements, and
    a ½ light distribution angle of each of the light emitting elements is equal to or narrower than 20 degrees.

5. A water droplet dramatization method comprising:
    intermittently generating water droplets and emitting light having a ½ light distribution angle equal to or narrower than 20 degrees along a downward travel path of the water droplets at predetermined cycles; and
    temporally dividing one cycle into a plurality of sections to adjust a light emission state per each of the sections.

* * * * *